United States Patent [19]
Fortson

[11] Patent Number: 5,546,151
[45] Date of Patent: Aug. 13, 1996

[54] MASKING DEVICE FOR CREATING MULTIPLE IMAGE IN PHOTOGRAPHS

[76] Inventor: Raymond A. Fortson, 7650 Linden, West Bloomfield, Mich. 48234

[21] Appl. No.: 218,718

[22] Filed: Mar. 25, 1994

[51] Int. Cl.$^6$ ................................................ G03B 11/00
[52] U.S. Cl. ................................................ 354/296
[58] Field of Search ................................ 354/110, 120, 354/122, 295, 296

[56] References Cited

U.S. PATENT DOCUMENTS

| | | |
|---|---|---|
| D. 234,007 | 12/1974 | Ritter . |
| D. 234,008 | 12/1974 | Ritter . |
| 1,056,588 | 3/1913 | Rusk . |
| 1,068,862 | 7/1913 | Digweed . |
| 3,122,077 | 2/1964 | Spendore . |
| 3,719,128 | 3/1973 | Simmons . |
| 3,940,775 | 2/1976 | Bodnar . |
| 4,107,716 | 8/1978 | Pfefer . |
| 4,124,859 | 11/1978 | Huber . |
| 4,137,540 | 1/1979 | Curtis . |
| 4,423,939 | 1/1984 | Hayles . |
| 4,707,106 | 11/1987 | Johnson et al. ............... 354/295 |
| 4,708,449 | 11/1987 | Thomas ....................... 354/122 |
| 5,073,789 | 12/1991 | Mumpower ................... 354/122 |

*Primary Examiner*—David M. Gray
*Attorney, Agent, or Firm*—Weintraub DuRoss & Brady

[57] ABSTRACT

A masking apparatus universally adaptable to fit camera lenses for creating multiple exposure photographs including a masking device insertable within commercial filter holders mountable on a lens of a camera. The masking device having at least two apertures formed therein which are alignable with an exposure area of the lens of the camera. Aperture alignment is accomplished by sliding the masking device within the filter holder until the desired aperture is positioned in the desired location.

3 Claims, 2 Drawing Sheets

FIG 1
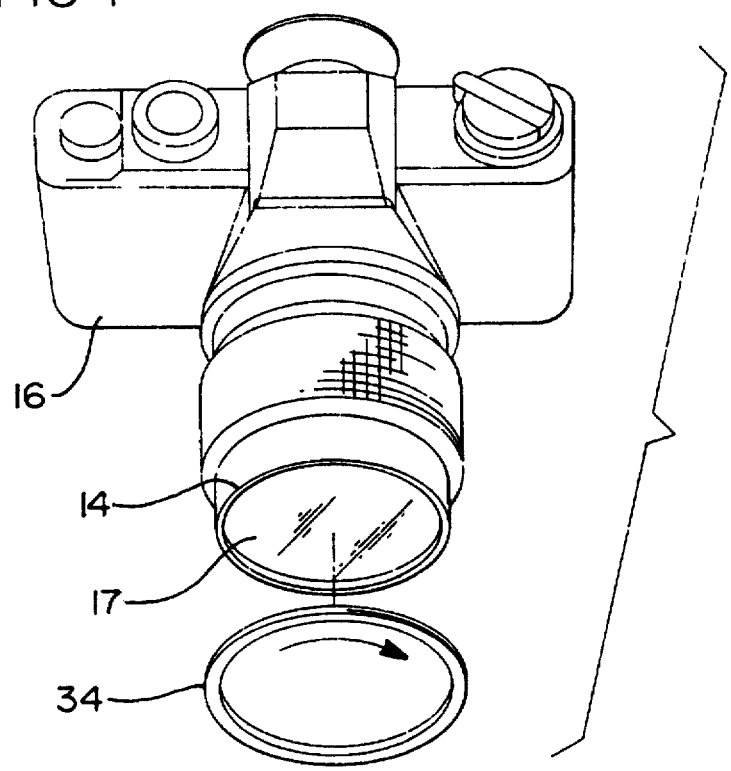
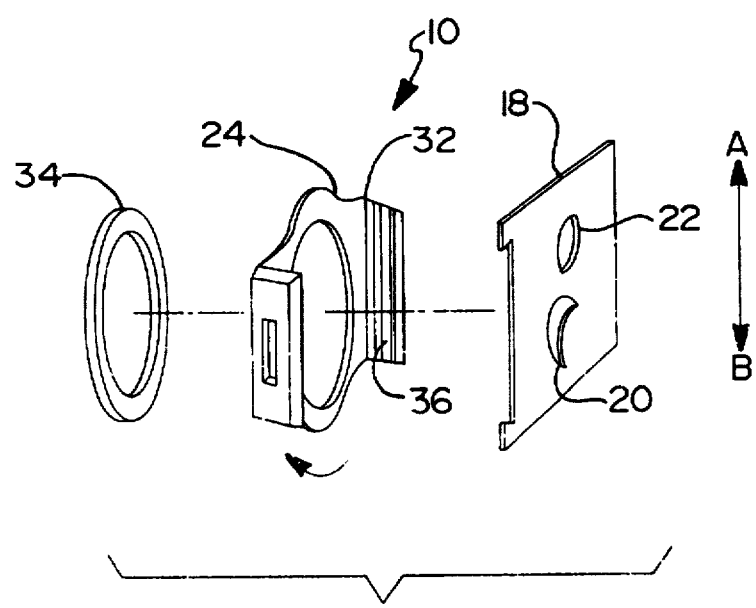
FIG 2

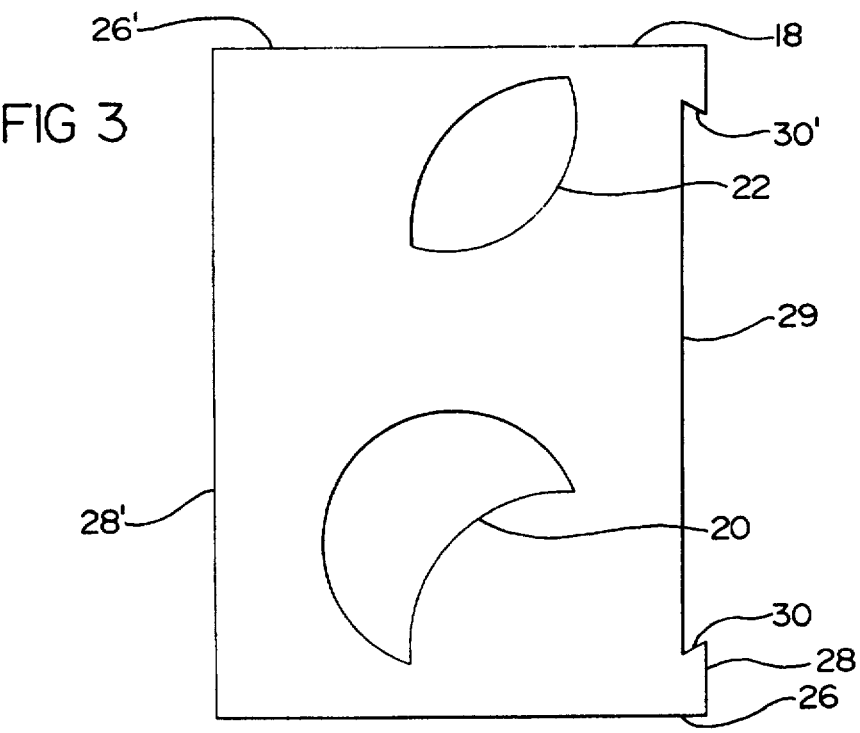
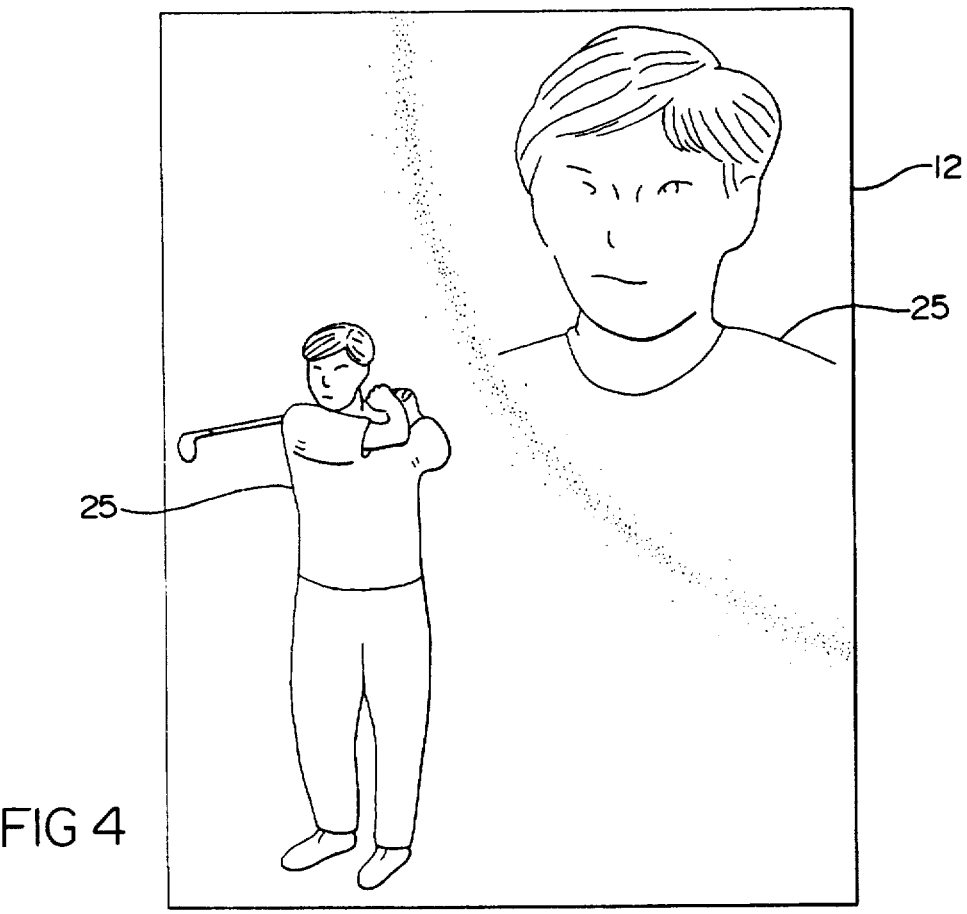

MASKING DEVICE FOR CREATING MULTIPLE IMAGE IN PHOTOGRAPHS

BACKGROUND OF THE INVENTION

I. Field of the Invention

The present invention relates generally to devices for creating multiple image photographs. More particularly, a device for creating a multiple image photograph which is universally adaptable to non-custom camera attachments.

II. Description of the Prior Art

The creating of multiple image photographs is an old and well established art. The traditional devices and methods of producing multiple images on photographic film have used attachments which are attached to a lens for a camera for many years. The device to create multiple images, usually incorporated within the lens attachment or insertable into the lens attachment, is a mask or screen. The mask commonly has a portion which is open and a portion which is closed. The open portion of the mask permits light to access the lens exposing a first portion of the film that is housed in the camera. The closed portion of the mask seals the second portion of the film from access to the light.

Typical lens attachments with masking devices are disclosed in U.S. Pat. Nos. 1,068,862, 3,122,077, 3,719,128, Des. 234,007 and Des. 234,008. The disclosed lens attachments are uniquely designed to accommodate circular masks having a single aperture or opening formed therein. The above prior art teaches that the masks may be rotated while attached to the lens, thus placing the opening at the desired position. This permits the operator of the camera to select where the exposed portions will be located on the film. U.S. Pat. No. 1,068,862 also teaches that more than one opening may formed in the mask.

Other typical lens attachments are U.S. Pat. Nos. 3,940, 475, 4,107,716, 4,137,540, 4,423,939, 4,708,449 and 5,073, 289 which disclose unique square or rectangular lens attachments uniquely designed to accommodate specific masks with one or more openings formed therein. The above prior art teaches that the masks are housed in dedicated unique lens attachments and are insertable into the lens attachments to produce the desired multiple image exposure on a portion of the film in the camera. To change exposure positions, the first mask is removed from the attachment and another mask is inserted into the attachment to expose another portion of the film. Additionally, the above prior art teaches that some masks have multiple openings which are re-positioned within the lens attachment when a new exposure position is desired.

U.S. Pat. No. 4,124,859, on the other hand, discloses a unique circular lens attachment which uses a replaceable mask. It teaches that when a change in an exposure position on the film is desired, the mask in the attachment is replaced by another mask. The art further teaches that the opening in the mask can be any shape.

Each of the above cited prior art references teach that each holding device or lens attachment for housing the masking device is uniquely designed to accommodate the particular masking device housed therein. Therefore, the masking devices used with other lens attachments are not interchangeable from one lens attachment to another. To use the masking device, the user must incur the expense of purchasing an entire masking system which includes the masking device and the lens attachment unique to that masking device. These device packages are not interchangeable between cameras of different manufacturers. Therefore, camera users who use multiple cameras of different makes incur the expense of purchasing a masking system for each camera or carrying more than one camera if different masking devices are required.

Thus, a masking device which is designed to be adaptable to commercial filter holders that are interchangeable between different makes of cameras with or without an adaptor is greatly desired. Also, a masking device which would be usable with commercially made filter holders that are interchangeable between cameras would reduce the number of lens attachments and cameras required and the expense of using several unique lens masking devices with their attachments.

SUMMARY OF THE INVENTION

The present invention addresses the problems encountered with creating a multiple image photograph without a large investment in expensive lens attachments and masking devices. The present invention provides an apparatus attachable to a camera for exposing photographic film to create multiple images on a single frame which is universally adaptable to many commercially produced lens filter attachments. The apparatus includes:

(a) a masking device for masking a portion of an exposure area of a camera lens which exposes light to film in the camera, the masking device having a first aperture and a second aperture formed therein, the first aperture and the second aperture defined as being within the parameters of the exposure area of the camera lens; and (b) means for mounting the masking device to the lens of the camera.

The means for mounting the masking device and the lens of the camera cooperate to expose light on the film within the camera to create a multiple image on the film. The masking device is preferably rectangular and preferably made from plastic, but be made from metal such as aluminum. The masking device is insertable into the means for mounting the masking device.

The means for mounting the masking device is preferably a commercially available filter holder attachable to the lens of the camera which is used to hold other devices in addition to the masking device. The filter holder may be attachable to most any size lens with or without the use of an adaptor. The masking device is insertable into the filter holder and removable from the filter holder while it is mounted to the lens of the camera.

The apertures of the masking device are positionable within the filter holder by sliding the masking device to properly position the desired aperture within the exposure area of the camera lens. The apertures compliment each other.

The present invention will be better understood with reference to the following detailed discussion and to accompanying drawings wherein like reference numerals refer to like elements and in which:

BRIEF DESCRIPTION OF DRAWINGS

FIG. 1 is an exploded perspective view of the camera, lens and adaptor;

FIG. 2 is an exploded perspective view of an embodiment of the apparatus of the present invention;

FIG. 3 is a plan view of the masking device; and

FIG. 4 is a front view of a multiple image photograph.

DETAILED DESCRIPTION OF PREFERRED EMBODIMENTS

Now with reference to the drawings, FIGS. 1–4, there is depicted therein an embodiment of a masking apparatus in accordance with the present invention, generally denoted at 10, for creating multiple image photographs 12. The apparatus 10 is attachable to a lens 14 of a camera 16 and generally comprises:

(a) a masking device 18 for masking a portion of an exposure area 17 of a camera lens 14 which exposes light to film in the camera 16, the masking device 18 having a first aperture 20 and a second aperture 22 formed therein; and (b) means 24 for mounting the masking device 18 to the lens 14 of the camera 16.

The masking device 18 is slidable within the means 24 for mounting to align the first aperture 20 with a first portion of the exposure area 17 of the camera lens 14, and align the second aperture 22 with a second portion of the exposure area 17 of the camera lens 14. The first aperture 20 is within the parameters of the exposure area 17 of the camera lens when a first exposure is made and the second aperture 22 is within the parameters of the exposure area 17 of the camera lens 14 when a second exposure is made.

The masking device 18, the means 24 for mounting and the lens 14 of the camera 16 cooperate to expose a subject 25 to create a multiple image on a film installed in the camera 16. As shown in FIG. 4, this is reproduced as a multiple image photograph 12.

As shown in FIG. 3, the masking device 18 is preferably rectangular in shape. Also, the masking device 18 is preferably made from plastic but may be made from a metal such as aluminum or any other suitable material.

The preferred embodiment of the masking device 18 has two apertures 20, 22 formed therein but may have any number of apertures greater than one. The first aperture 20 is preferably different in shape than the second aperture 22 such that the first and second aperture 20, 22 complement each other, but may be the same shape if desired. As shown in FIG. 3, the first aperture 20 is preferably a first circle portion which is essentially a crescent shape. The second aperture 22 is a second circle portion which is essentially an oval shape, but in any case the second circle portion is the shape of that portion of the exposure area 17 of the lens 14 not exposed to the first aperture 20, i.e. the two portions cooperate to define a full circle.

The masking device 18 has a first end 26, an opposing second end 26', an elongated first side 28 and an opposing elongated second side 28'. The masking device 18 has an elongated notch 29 formed therein on any one of the two opposing elongated sides 28 or 28'. The elongated notch 29 is bracketed by a first stop 30 proximate the first end 26 and an opposing second stop 30' proximate the second end 26', as detailed subsequently.

Alternatively, and although not shown, a lens may cover the first and second apertures 20, 22. The lens may be a specialty lens or a filter such as frosted or colored glass. Alternatively, the masking device 18 may be used with independent filters which are insertable in the means 24 for mounting the masking device 18 along with the masking device 18.

As shown in FIG. 2, the masking device 18 is insertable into the means 24 for mounting. The means 24 for mounting is preferably a commercial filter holder such as a Cokin Creative Filter System which is commercially available and universally adaptable to any standard or non-standard camera lens 14 by using adaptor rings 34.

The filter holder 32 has a plurality of grooves 36 formed therein to receive and hold the masking device 18 during use. The grooves 36 may also hold other devices such as filters. Also, as shown in FIG. 2, the masking device 18 is slidable within the grooves 36 of the filter holder 32. The masking device 18 is slidable in direction "A" until the stop 30 urges against the filter holder 32. This positions the first aperture 20 such that the first portion of the exposure area 17 is accessible and the second portion of the exposure area 17 is masked. After the film has been exposed, the masking device 18 is slidable in the opposite direction "B" until the stop 30' urges against the filter holder 32. This positions the second aperture 22 such that the second portion of the exposure area 17 is accessible and the first portion is masked.

In use, the means 24 for mounting the masking device 18 is attached to the lens 14 of the camera 16 by using an adaptor 34 if the means for mounting is not capable of being directly attachable. After the means 24 for mounting is attached to the lens 14, the masking device 18 is then positioned within the means for mounting 24 placing the desired aperture 20 or 22 within the exposure area 17 of the lens 14. An operator then positions the camera 16 on the desired subject 25 and operates the camera 16 to expose the subject 25 to the film within the camera. After the first exposure is made, the masking device 18 is repositioned within the means 24 for mounting to permit another aperture 20 or 22 to be positioned within the exposure area 17 of the lens 14. The operator then positions the camera 16 and operates the camera 16 to expose the subject 25 to the film within the camera 16. Thus, a multiple exposure is created on the film within the camera which, when developed, results in a multiple exposure photograph 12.

The masking device 18 and the means 24 for mounting the device is universally adaptable and is usable on a large number of commercial cameras 16 and lenses 14, thus substantially reducing the need for several cameras and several pieces of expensive equipment. Also, the cost of acquiring and using such a masking apparatus is greatly reduced.

Having described the present invention, what is claimed is:

1. A masking apparatus universally attachable to a lens of a camera for creating multiple image photographs, the apparatus comprising:

(a) a masking device for masking a portion of an exposure area of the camera lens which exposes light to film within the camera, the masking device having a first aperture and a second aperture formed therein, a first end and an opposing second end, an elongated first side and an opposing elongated second side, an elongated slot formed in one of the two opposing elongated sides of the masking device, the slot bracketed by a first stop proximate the first end and an opposing second stop proximate the second end and wherein the first stop and second stop coorperate with a means for mounting to align the first aperture and the second aperture with the first portion and the second portion respectively of the exposure area of the lens of the camera to enable double exposure photographs;

(b) means for mounting the masking device to the lens of the camera and wherein the masking device is slidable within the means for mounting to enable the first aperture to access a first portion of the exposure area of the camera lens and the second aperture to access a second portion of the exposure area of the cameras lens, the first aperture is defined as being within the parameters of the exposure area of the camera lens when a first exposure is made and the second aperture is defined as being within the parameters of the exposure area of the camera lens when a second exposure is made.

2. A masking apparatus universally attachable to a lens of a camera for creating multiple image photographs, the apparatus comprising:

(a) a masking device for masking a portion of an exposure area of the camera lens which exposes light to film within the camera, the masking device having at least a first aperture and a second aperture formed therein, the first aperture defining a first portion of a circle and being essentially a crescent shape the masking device further including a first end and an opposing second end, an elongated first side and an opposing elongated second side, an elongated slot formed in one of the two opposing sides of the masking device, the slot bracketed by a first stop proximate the first end and an opposing second stop proximate the second end and wherein the first stop and second stop coorperate with a means for mounting to selectively align the first aperture and the second aperture with the exposure area of the lens of the camera to enable double exposure photographs;

(b) means for mounting the masking device to the lens of the camera and wherein the masking device is slidable within the means for mounting to enable the first aperture to access a first portion of the exposure area of the camera lens and the second aperture to access a second portion of the exposure area of the camera lens, the first aperture is defined as being within the parameters of the exposure area of the camera lens when a first exposure is made and the second aperture is defined as being within the parameters of the exposure area of the camera lens when a second exposure is made.

3. The masking apparatus of claim 2 wherein the masking device comprises:

a second aperture defining a second portion of a circle and being essentially an oval shape.

* * * * *